United States Patent [19]

Helms

[11] Patent Number: 4,825,902

[45] Date of Patent: May 2, 1989

[54] FLAPPER VALVE WITH PROTECTIVE HINGE PIN SLEEVE

[75] Inventor: Lonnie C. Helms, Duncan, Okla.

[73] Assignee: Halliburton Company, Duncan, Okla.

[21] Appl. No.: 142,613

[22] Filed: Jan. 11, 1988

[51] Int. Cl.[4] .............................................. F16K 15/03
[52] U.S. Cl. ..................................... 137/515; 137/527
[58] Field of Search .................. 137/527, 527.8, 512.1, 137/515

[56] References Cited

U.S. PATENT DOCUMENTS

| | | | |
|---|---|---|---|
| 2,537,099 | 1/1951 | Smith | 137/527.8 X |
| 2,637,264 | 5/1953 | Harmon | 137/527.8 X |
| 3,016,914 | 1/1962 | Keithahn | 137/527 X |
| 3,144,876 | 8/1964 | Frye | 137/454.5 |
| 3,292,653 | 12/1966 | Scaramucci | 137/527.8 X |
| 3,348,569 | 10/1967 | Frye | 137/269.5 |
| 3,481,397 | 12/1969 | Baker | 137/493.1 X |
| 3,965,926 | 6/1976 | Buckner | 137/512.1 |
| 4,474,241 | 10/1984 | Freeman | 137/614.14 X |
| 4,605,041 | 8/1986 | Teumer | 137/527 |

OTHER PUBLICATIONS

Halliburton Services Sales and Service Catalog No. 43, p. 2431.
Weatherford Float and Guide Equipment Catalog, p. 20.
Davis-Lynch, Inc., 1984–1985 Catalog, p. 28.
Gemoco Float Equipment Catalog, p. 17.
Corken International Corp. Service Manual pp. H104F and H105F.

*Primary Examiner*—John Rivell
*Attorney, Agent, or Firm*—Mark E. McBurney; Neal R. Kennedy

[57] ABSTRACT

A flapper valve with a protective hinge pin sleeve. The valve includes a flapper assembly having a flapper with the protective hinge pin sleeve disposed through an ear of the flapper. The hinge pin sleeve is preferably made of a relatively harder material than the flapper to reduce wear on the flapper as the flapper assembly is pivoted on a pivot pin. One embodiment of a flapper valve for use in a down hole tool is disclosed.

17 Claims, 2 Drawing Sheets

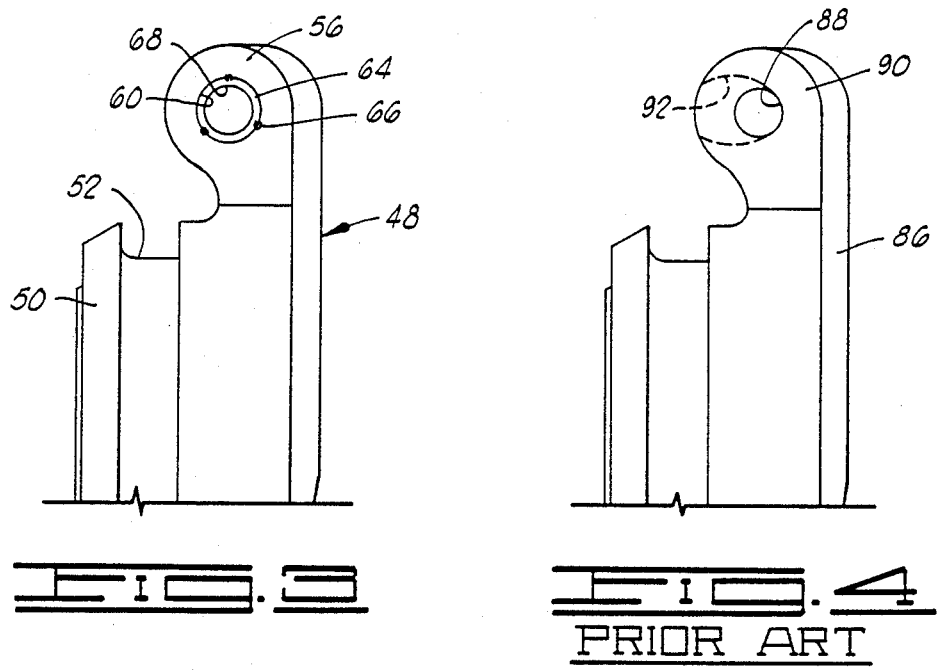
FIG. 3
FIG. 4 PRIOR ART
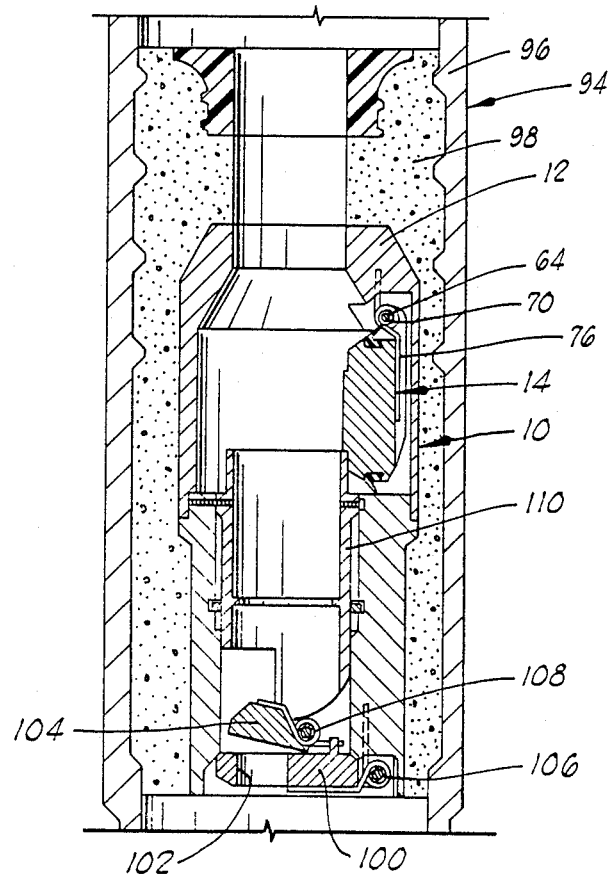
FIG. 5

FLAPPER VALVE WITH PROTECTIVE HINGE PIN SLEEVE

BACKGROUND OF THE INVENTION

1. Field Of The Invention

This invention relates to flapper valves, and more particularly, to a valve with a flapper having a protective hinge or pivot pin sleeve for reducing wear on the flapper.

2. Description Of The Prior Art

Drillable flapper valves have been used for many years in a variety of applications, such as in the oil industry as a means for preventing backflow of displaced well fluids. The life of flapper valves is generally shorter than other types of float equipment check valves, such as poppet valves and ball valves, because of wear on the flapper.

Historically, the flappers in floating equipment flapper valves have been made from materials such as cast iron or aluminum alloys. Cast iron valves have a shortcoming in that they are inherently brittle. This is detrimental because accessory equipment sometimes requires an activating ball to be pumped at high rates past the valve. The impact is such that it may shatter the cast iron hinge portion causing not only a check valve failure but also other tool or job failures therebelow. Aluminum valves have been used because they are more ductile and better resist impact. However, when used over extended periods, aluminum hinges wear due to the cycling caused by pump strokes. This wear occurs around a hinge or pivot pin, generally made of steel, which holds the flapper in place. The obvious consequence of this wear is potential flapper failure and again, possible failure of equipment below the flapper valve.

The present invention which utilizes protective hinge or pivot pin sleeve means greatly reduces the wear to the flapper by providing a bearing surface between the flapper hinge or ear portion and the hinge or pivot pin. The protective sleeve which is made of a suitably hard material is installed as an integral part of a flapper assembly and thereby rotates with the flapper on the hinge pin. Because the sleeve can be made of a material relatively harder than the flapper, aluminum flappers may still be used to take advantage of their ductility and resistance to impact.

In addition to floating equipment flapper valves, the present invention is applicable to any other type of flapper valve.

SUMMARY OF THE INVENTION

The present invention includes a flapper assembly for use in a flapper valve. The flapper assembly comprises a flapper having a portion positionable adjacent a seat in the valve and having a hinge or ear extending from said portion of the flapper, and protective sleeve means disposed through the hinge or ear for receiving a hinge or pivot pin therethrough. In the preferred embodiment, the sleeve means is characterized by a substantially cylindrical sleeve positioned in a hole defined in the ear. The sleeve may be pressed in the hole, and an end of the sleeve may be opened adjacent the hole in the ear for securing the sleeve to the flapper.

In one embodiment, the ear on the flapper assembly is one of a pair of spaced ears, and the sleeve means extends between the ears.

Preferably, the sleeve is made of a relatively harder material than the flapper. For example, but not by way of limitation, the sleeve may be made of steel and the flapper made of aluminum.

In one embodiment, the flapper assembly further comprises biasing means for biasing said portion of the flapper toward the seat in the valve. The biasing means may be characterized by a torsion spring comprising a coiled portion disposed around the sleeve, a first end engaging said portion of the flapper, and a second end engagable with a body portion of the valve.

Sealing means may be provided on said portion of the flapper for sealing engagement with the seat when the flapper is in a closed position.

The present invention also includes a flapper valve comprising a body having a pivot support defining a hole therein and a seat portion, a flapper disposed in the body, the flapper comprising a central portion disposed adjacent the seat portion when in a closed position and an ear portion extending outwardly from the central portion. The ear portion defines a hole therein aligned with the hole in the pivot support. The flapper valve further comprises a pivot sleeve fixedly disposed in the hole in the ear portion and a pivot pin disposed in the sleeve and the hole in the pivot support. The pivot pin is sized such that the sleeve is pivotable thereon. In other words, the flapper and sleeve assembly may be pivoted alternately toward and away from the seat in the body.

It is an important object of the present invention to provide a flapper assembly for use in a flapper valve having protective hinge or pivot pin sleeve means disposed therethrough for reducing wear on the flapper.

Another object of the present invention is to provide a flapper valve with a protective sleeve disposed through an ear portion of a flapper sized such that the sleeve is pivotable on a pivot pin in the valve.

A further object of the invention is to provide a protective hinge or pivot pin sleeve for use with a flapper wherein the sleeve is made of a relatively harder material than the flapper.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 3 is a side view of a flapper assembly of the present invention including protective hinge pin sleeve means.

FIG. 4 is a detailed side view of a prior art flapper with an indication of typical wear.

FIG. 5 is a cross-sectional view of a casing shoe assembly utilizing several flapper valves, each of which may be adapted to include the protective hinge pin sleeve means of the present invention.

DESCRIPTION OF THE PREFERRED EMBODIMENT

Figure 1:
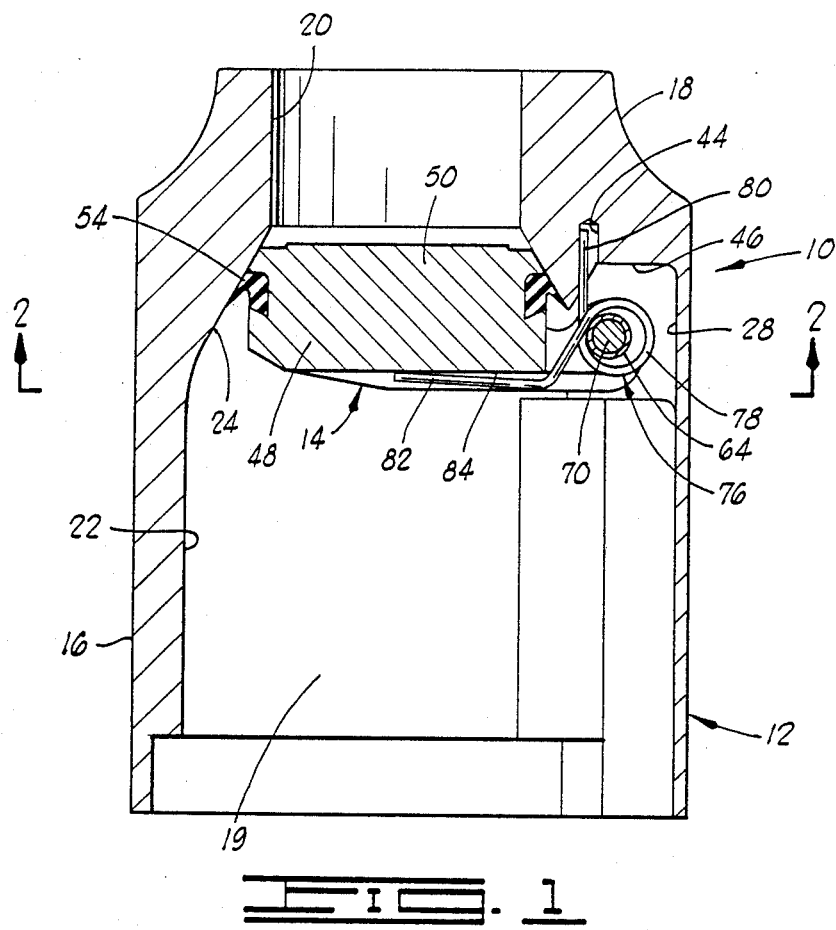
FIG. 1 is a longitudinal cross section of a drillable flapper valve of the present invention which may be used in floating equipment in the lower end of a well casing.
Figure 2:
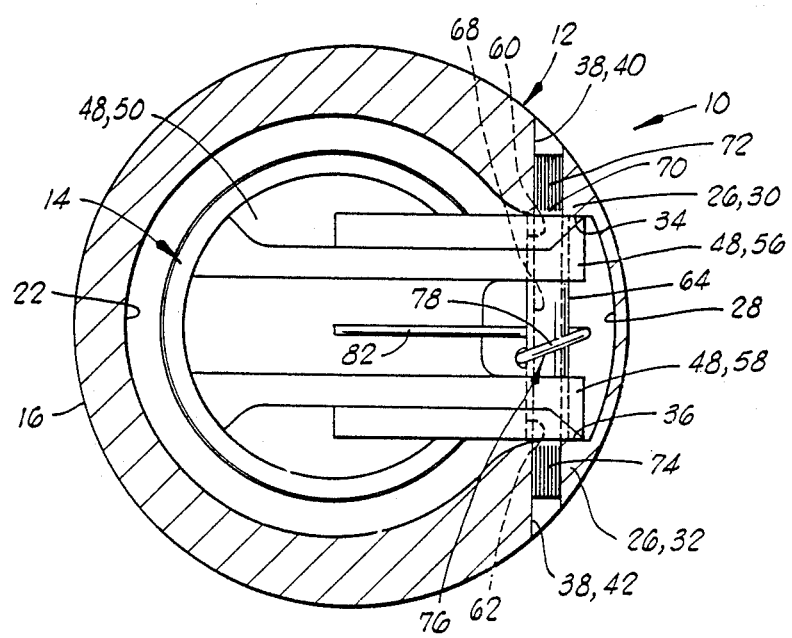
FIG. 2 is a cross section taken along lines 2—2 in FIG. 2.

Referring now to the drawings, and more particularly to FIGS. 1 and 2, a flapper valve using the protective hinge pin sleeve means of the present invention is shown and generally designated by the numeral 10. Valve 10 includes a body 12 with a flapper assembly 14 disposed therein.

As illustrated herein, body 12 is made of a drillable material such as a molded plastic and is adapted for use in a down hole tool such as a well casing shoe or similar device. It is not intended that the invention be limited to such a device, however. Body 12 has a substantially cylindrical outer surface 16 with an inwardly tapered upper end 18. Body 12 defines a central cavity 19 therethrough, generally formed by a first bore 20 and a relatively larger second bore 22. First and second bores 20 and 22 are interconnected by a generally tapered seat portion 24.

First and second bores 20 and 22 are preferably concentric with one another and offset from a longitudinal center line of outer surface 16, as best seen in FIG. 2. In this way, an enlarged section 26 is formed to one side of body 12.

A generally rectangular recess 28 is formed or cut into enlarged section 26 such that enlarged section 26 forms a pair of hinge or pivot supports 30 and 32 with a pair of opposite, substantially parallel faces 34 and 36.

A transverse hole 38 is drilled or molded in body 12 such that it extends through enlarged portion 26 of the body. It will thus be seen that hole 38 forms a pair of aligned hole portions 40 and 42 which are substantially perpendicular to faces 34 and 36, respectively.

Referring again to FIG. 1, a longitudinally extending elongated hole or recess 44 is defined in body 12, extending away from wall 46 of recess 28.

Flapper assembly 14 includes a flapper 48 which is disposed in body 12. Flapper 48 has a substantially disc-shaped central portion 50 positionable adjacent seat portion 24 of body 12. As shown in FIG. 3, a seal groove 52 is annularly formed in central portion 50. An annular seal means 54 of a kind known in the art is disposed in seal groove 52 and is adapted for sealing engagement with seat portion 24 of body 12 when flapper assembly 14 is in the closed position shown in FIG. 1.

In the preferred embodiment, a pair of spaced hinges or ears 56 and 58 extend outwardly from central portion 50 into recess 28 in body 12. As best seen in FIG. 2, ear 56 is positioned adjacent face 34, and ear 58 is positioned adjacent face 36. Preferably, ears 56 and 58 are integrally formed with central portion 50 of flapper 48.

Ears 56 and 58 have aligned holes 60 and 62 therethrough, respectively. A protective hinge or pivot pin sleeve means 64, which may be characterized in one embodiment by a substantially cylindrical sleeve 64, is positioned through holes 60 and 62, such as with a press fit. As best seen in FIG. 2, sleeve 64 thus extends between ears 56 and 58. Referring to FIG. 3, at least one end of sleeve 64 is preferably peened adjacent the respective ear, such as indicated by reference numeral 66, to further insure that sleeve 64 is rigidly and fixedly attached to flapper 48. Thus, sleeve 64 may be considered a part of flapper assembly 14.

It should be noted that while a flapper with two ears is shown in the drawings, the protective sleeve means could also be used on a flapper with a single ear or a flapper with more than two ears.

Sleeve 64 is hollow and defines a substantially cylindrical hole 68 therethrough. As will be seen in FIG. 2, flapper 14 is positioned such that hole 68 in sleeve 64 is aligned with hole portions 40 and 42 in body 12.

A hinge or pivot pin 70 of a kind known in the art is disposed through hole portions 40 and 42 in body 12 and hole 68 in sleeve 64, thus providing a pivotal connection between flapper assembly 14 and body 12. Hinge pin 70 has grooved ends 72 and 74 which insure that the hinge pin is fixedly located in hole portions 40 and 42, respectively, and rotation of the hinge pin with respect to body 12 is prevented.

Another preferred component of flapper assembly 14 is a biasing means 76 for biasing flapper assembly 14 to the closed position shown in FIG. 1. Biasing means 76 may be characterized by a torsion spring 76 of a kind known in the art having a central coiled portion 78 with first and second ends 80 and 82 extending therefrom. As seen in FIG. 2, coiled portion 78 extends around sleeve 64. Obviously, coiled portion 78 must be so positioned as sleeve 64 is being assembled into flapper 48, and thus biasing means 76 also becomes an integral part of flapper assembly 14.

Referring again to FIG. 1, first end 80 of torsion spring 76 is adapted for extending into hole 44 in body 12. Second end 82 of spring 76 is bent such that it engages side 84 of central portion 50 of flapper 48. It will be seen by those skilled in the art that as flapper assembly 14 is pivoted counterclockwise as shown in FIG. 1 to an open position, torsion will be applied to biasing means 76, and when flow through valve 10 ceases, the biasing means will reclose the valve. This operation of the biasing means is also known in the art.

The unique construction of flapper assembly 14 may be compared with a prior art flapper 86, illustrated in FIG. 4. Much of the construction of 86 is identical to flapper 48 except that flapper 86 includes holes 88 through ears 90 thereof with no protective sleeve means disposed therethrough. In other words, the hinge pin upon which flapper 86 is pivotally mounted, is in direct contact with the surfaces forming holes 88. Because the flapper is preferably of a ductile material such as aluminum, recycling of the flapper will cause hole 88 to be enlarged due to wear from the hinge pin. Eventually, this wear will be great enough that the flapper may actually become disengaged from the hinge pin. Such a wear pattern is indicated by the reference numeral 92 in FIG. 4.

Flapper assembly 14 which includes protective hinge pin sleeve means 64, preferably made of a relatively harder material than flapper 48, such as steel, prevents the previous type of wear shown in FIG. 4. In other words, flapper assembly 14 provides much greater service life than previously known flappers.

Referring now to FIG. 5, a differential fill valve assembly is illustrated which may use valve 10 with flapper assembly 14 including protective hinge pin sleeve 64 of the present invention. Such a differential fill valve assembly without a protective hinge pin sleeve is illustrated in a co-pending patent application, attorney docket number PC-1328, assigned to the assignee of the present invention. Briefly, valve 10 as described in FIGS. 1-3, may be included in a float collar 94. Float collar 94 includes among other components, a generally cylindrical steel tubing portion 96 with a cement casting 98 disposed therein. Valve 10 is molded into cement casting 98.

Disposed below valve 10 is another, similar flapper assembly 100. Flapper assembly 100 is adapted to hinge in the same direction as flapper assembly 14 and has a longitudinally extending hole 102 therethrough. Another, smaller but similar flapper assembly 104 is attached to flapper assembly 100 for sealingly closing hole 102. Flapper assembly 104 pivots in an opposite direction and allows for automatic filling as float collar 94 is run into the well hole. Both flapper assemblies 100 and 104 may utilize protective hinge pin sleeve means 106 and 108, respectively, similar to sleeve means 64 in flapper assembly 14.

In the device shown in FIG. 5, flapper assembly 14 is held in an open position by a releasing sleeve 110. Releasing sleeve 110 may be moved away from flapper assembly 14 by dropping a weighted ball through the float collar. When this occurs, biasing means 76 moves flapper assembly 14 to the closed position as already discussed. Further discussion of this valve is found at page 2431 of Halliburton Services Sales and Service Catalog No. 43.

The actual operation of float collar 94 shown in FIG. 5 herein is not critical to the present invention, but is merely illustrated to show several usages of flappers in which protective hinge pin sleeves may be used. The drillable valve 10 with its body 12 discloses one configuration of a body containing a flapper assembly such as flapper assembly 14. It is not intended that the invention be limited to the particular valve body configuration shown, nor is it intended that the invention be limited to only down hole tools. For example, the same type of flapper assembly with protective hinge pin sleeve means could be utilized in any flapper-type back check valve.

It will be seen, therefore, that the flapper valve with protective hinge pin sleeve means of the present invention is well adapted to carry out the ends and advantages mentioned as well as those inherent therein. While a presently preferred embodiment of the apparatus has been disclosed for the purposes of this disclosure, numerous changes in the arrangement and construction of parts may be made by those skilled in the art. All such changes are encompassed within the scope and spirit of the appended claims.

What is claimed is:

1. A flapper assembly for use in a piece of flapper valve type floating equipment installed in a casing in a wellbore, said flapper valve type floating equipment having a seat and a hinge pin therein, said flapper assembly comprising:
   a flapper having a portion positionable adjacent said seat in said flapper valve type floating equipment and having an ear extending from said portion, said flapper being constructed from soft ductile, easily wearable material which can be easily removed by drilling from said casing in said wellbore;
   sleeve means disposed through said ear, and secured thereto, of said flapper for receiving said hinge pin therethrough, said sleeve means being constructed of relatively hard material in relation to said flapper, said sleeve means reducing wear to said flapper by providing a bearing surface between said flapper and said hinge pin thereby preventing wear of said flapper during the rotation thereof in said flapper valve type floating equipment by confining wear during the rotation of said flapper to said sleeve and said pin while preventing rotation of said sleeve with respect to said flapper; and
   biasing means for biasing said portion of said flapper toward said seat, independent of the orientation of said flapper assembly.

2. The flapper assembly of claim 1 wherein said sleeve means is characterized by a substantially cylindrical sleeve positioned in a hole defined in said ear.

3. The flapper assembly of claim 2 wherein said sleeve is of a relatively harder material than said flapper.

4. The flapper assembly of claim 3 wherein said sleeve is steel.

5. The flapper assembly of claim 3 wherein said flapper is aluminum.

6. The flapper assembly of claim 2 wherein said sleeve is pressed in said hole.

7. The flapper assembly of claim 2 wherein an end of said sleeve is peened adjacent said hole in said ear for securing said sleeve to said flapper.

8. The flapper assembly of claim 1 wherein said biasing means is characterized by a torsion spring comprising:
   a coiled portion disposed around said sleeve;
   a first end engaging said portion of said flapper; and
   a second end engagable with a body portion of said valve.

9. The flapper assembly of claim 1 further comprising sealing means on said portion of said flapper for sealing engagement with said seat when in a closed position.

10. The flapper assembly of claim 1 wherein said ear is one of a pair of spaced ears and said sleeve means extends between said ears.

11. A flapper valve for use in a piece of flapper valve type floating equipment installed in a casing in a wellbore, said flapper valve type floating equipment having a seat and a pivot pin therein, said flapper valve comprising:
   a body having a pivot support defining a hole therein;
   a flapper disposed in said body, said flapper being constructed from soft ductile, easily wearable material which can be easily removed by drilling from said casing in said wellbore, said flapper comprising:
      a central portion disposed adjacent said seat portion when in a closed position; and
      an ear portion extending outwardly from said central portion, said ear portion defining a hole therein aligned with said hole in said pivot support;
   a pivot sleeve fixedly disposed in said hole in said ear portion of said flapper for receiving said pivot pin therethrough, said pivot sleeve being constructed of relatively hard material in relation to said flapper, said pivot sleeve reducing wear to said flapper by providing a bearing surface between said flapper and said pivot pin, said pivot pin being sized such that said pivot sleeve is pivotable therearound, thereby preventing wear of said flapper during the rotation thereof in said flapper valve type floating equipment by confining wear during the rotation of said flapper to said pivot sleeve and said pivot pin while preventing rotation of said sleeve with respect to said flapper; and
   a spring, engaged with said body and said flapper, for biasing said flapper toward said closed position.

12. The valve of claim 11 wherein said flapper is made of a ductile material.

13. The valve of claim 12 wherein said flapper is aluminum.

14. The valve of claim 11 wherein said pivot sleeve is steel.

15. The valve of claim 11 further comprising a sealing ring on said central portion of said flapper for sealing engagement with said seat portion.

16. A flapper valve for use in a piece of flapper valve type floating equipment installed in a casing in a wellbore, said flapper valve type floating equipment having a seat and a pivot pin therein, said flapper valve comprising:
- a body defining a central cavity therein and a recess adjacent said seat, said body comprising:
  - a pair of spaced pivot supports with aligned holes defined therein;
- a flapper assembly disposed in said cavity, said flapper assembly being constructed from soft ductile, easily wearable material which can be easily removed by drilling from said casing in said wellbore, said flapper assembly comprising:
  - a flapper having a central portion and a pair of spaced ears extending therefrom, each of said ears being adjacent a pivot support and defining a hole therethrough aligned with said holes in said pivot support; and
  - a pivot sleeve fixedly disposed in said holes in said ears and extending therebetween, said pivot pin being insertable into said pivot sleeve such that said flapper is pivotable therearound, said pivot sleeve being constructed of relatively hard material in relation to said flapper, said pivot sleeve reducing wear to said flapper by providing a bearing surface between said flapper and said pivot pin, said pivot pin being disposed through said holes in said pivot supports and said pivot sleeve, thereby preventing wear of said flapper during the rotation thereof in said flapper valve type floating equipment by confining wear during the rotation of said flapper to said pivot sleeve and said pivot pin while preventing rotation of said sleeve with respect to said flapper; and
- a spring comprising:
  - a coiled portion disposed around said pivot sleeve between said ears;
  - a first end extending from said coiled position and adjacent said central portion of said flapper; and
  - a second end extending from said coiled portion into said recess.

17. The valve of claim 16 wherein said sleeve is relatively harder than said flapper.

* * * * *

UNITED STATES PATENT AND TRADEMARK OFFICE
CERTIFICATE OF CORRECTION

PATENT NO. : 4,825,902
DATED : May 2, 1989
INVENTOR(S) : Lonnie C. Helms

It is certified that error appears in the above-identified patent and that said Letters Patent is hereby corrected as shown below:

Col. 1, line 64, the word "opened" should read --peened--,

Signed and Sealed this

Twenty-third Day of January, 1990

*Attest:*

JEFFREY M. SAMUELS

*Attesting Officer*    *Acting Commissioner of Patents and Trademarks*